April 28, 1959 F. F. BRUCH 2,884,029
SAW BLADE SCRAPER FOR MEAT AND BONE SAWS
Filed Aug. 26, 1957 2 Sheets-Sheet 1
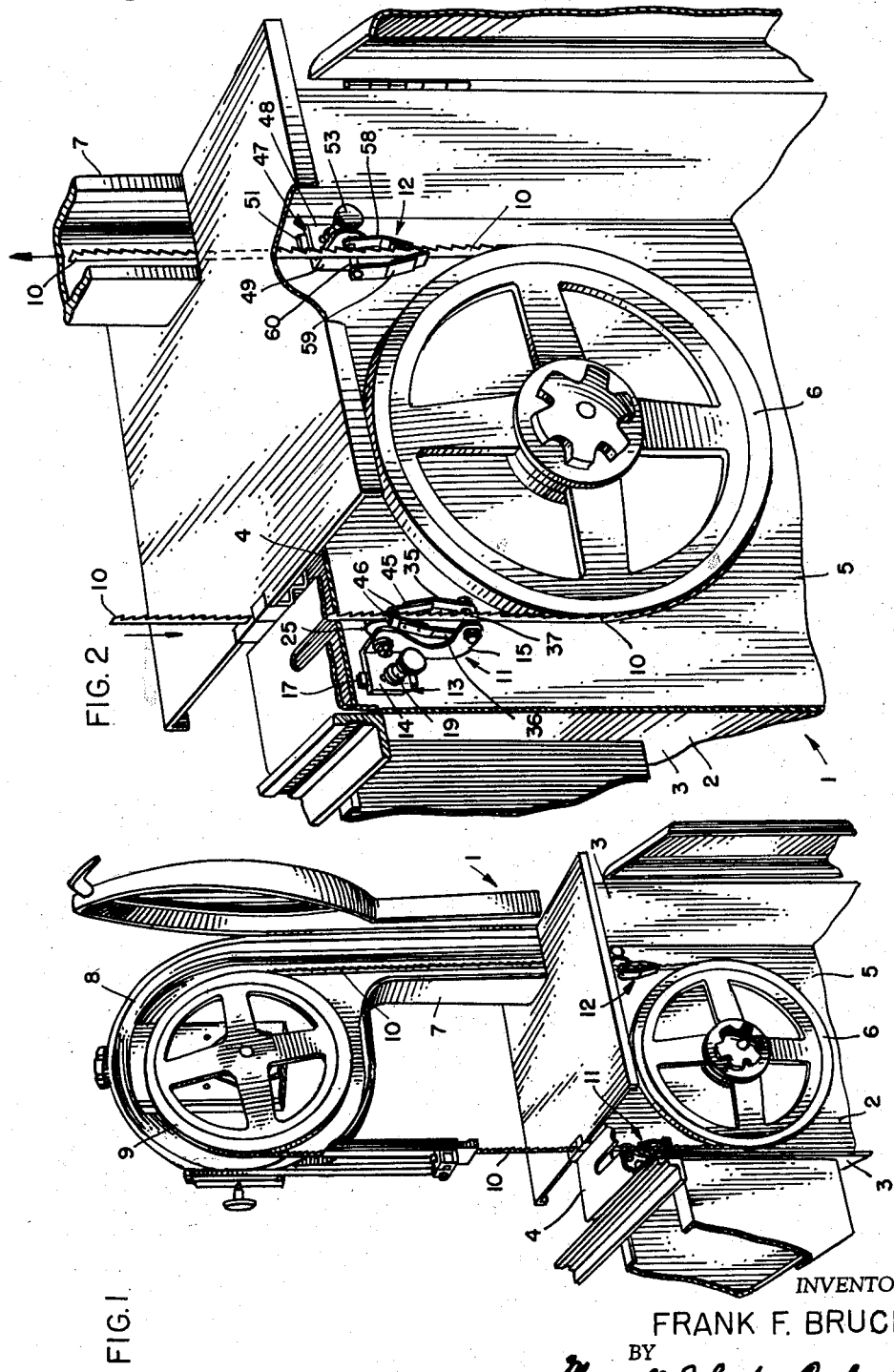
INVENTOR:
FRANK F. BRUCH
BY
Marzall, Johnston, Cook & Root
ATT'YS April 28, 1959  F. F. BRUCH  2,884,029
SAW BLADE SCRAPER FOR MEAT AND BONE SAWS
Filed Aug. 26, 1957  2 Sheets-Sheet 2

INVENTOR:
FRANK F. BRUCH
BY
ATT'YS

United States Patent Office 2,884,029
Patented Apr. 28, 1959

2,884,029

SAW BLADE SCRAPER FOR MEAT AND BONE SAWS

Frank F. Bruch, La Porte, Ind., assignor to U.S. Slicing Machine Company, Inc., La Porte, Ind., a corporation of Indiana Application August 26, 1957, Serial No. 680,066

5 Claims. (Cl. 143—158)

This invention relates to power meat cutting machines in general. More specifically, the invention relates to saw blade scrapers for meat cutting machines, which machines are usually referred to in the trade as "meat and bone saws."

Food handling machines, which include meat and bone saws, require the utmost in maintaining sanitation, and, therefore, must be constructed to permit ease in cleaning; particularly, the machines should be such that the various parts of the machine may be removed quickly and easily for cleaning purposes, and then readily applied in their clean state.

The saw blade scraper of the invention comprises a bracket which may be quickly applied or removed, the same being held in adjusted position by interfitting engagement of the bracket with a lug secured to a part of the machine or the machine frame. Adjustment is provided vertically to permit the wiping or scraping parts of the scraper to be located in proper position, and at the same time prevent lateral or side shifting to hold the saw blade in line. An easily handled locking setscrew, having an enlarged, easily operated, knurled head, engages the lug on the frame to lock the bracket in adjusted position. Flexible wiper blades, spaced apart at one end, are brought together toward their other end to create a wiping force or pressure against the opposite sides of the running saw blade to wipe away bone dust and meat particles from the saw and prevent them from lodging on the saw pulleys over which the saw is trained.

The primary object of the invention consists in the provision of new and improved saw blades, scrapers, or wipers which are so constructed and arranged to permit quick and easy application to a part of the machine frame and to permit quick and easy removal for cleaning purposes.

Another important object of the invention consists in the provision of a saw blade, scraper or wiper comprising a bracket member having an elongated horseshoe slot provided in the base thereof for locking the same to the machine frame and for the securement thereto of an adjustably mounted wheel which acts as a backing for the saw, there being spaced apart, flexible scrapers or wipers which are brought together at their forward ends for engagement with the opposed side edges of the saw.

A further object consists in the provision of a saw blade scraper of a new and improved design for locking the parts in adjusted position by the manipulation of a single setscrew and permitting the entire scraper assembly to be removed for cleaning purposes by the mere unloosening of the single screw.

Numerous other objects and advantages will be apparent throughout the progress of the specification which follows.

The accompanying drawings illustrate a certain selected embodiment of the invention, and the views therein are as follows:

Fig. 1 is a detail perspective view of a meat and bone saw and embodying the invention;

Fig. 2 is a detail perspective view on an enlarged scale showing the saw blade scrapers mounted on a part of the frame and arranged adjacent the periphery of the driving pulley which drives the endless saw.

Figure 3:
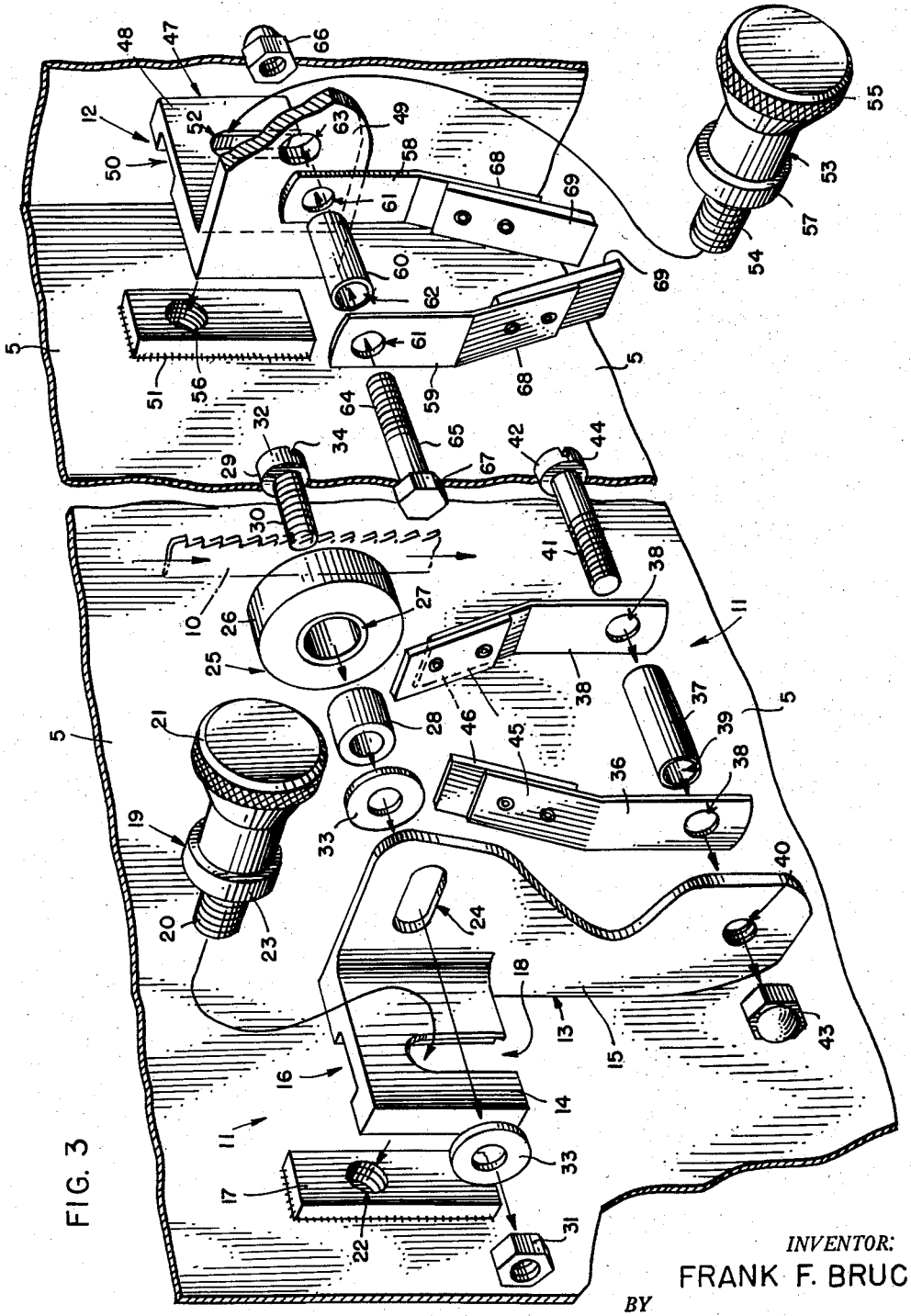
Fig. 3 is a detail perspective exploded view showing the various parts constituting the saw blade scraper or wiper of the invention.

The particular construction herein shown for the purpose of illustrating the invention comprises a main machine frame 1 having a lower cabinet 2 which includes enclosing side walls 3, 3 and a top plate 4. The cabinet 2 is divided from front to rear by a vertical plate 5 which carries a drive pulley 6 on one side, the pulley 6 being driven by a motor (not shown) arranged on the other side of the dividing wall 5.

The machine includes a vertical upstanding column or hood 7 terminating in a housing 8 at its upper end. The housing 8 carries an idler pulley 9 and an endless saw blade 10 is trained over the pulleys 6 and 9.

A front scraper 11, to the left Figs. 1, 2 and 3, is mounted on the same side of the dividing plate 5 as the pulley 6 and wipes away any bone dust, meat particles, or grease which may be on the knife 10 during the cutting operation to prevent that foreign material from falling on the periphery of the driven pulley 6. A rear scraper 12, to the right Figs. 1 to 3, is mounted on the same side of the plate 5 as the wiper 3. This scraper 12 cleans the saw to prevent the accumulation of foreign matter getting on the idler saw pulley 9.

Front scraper 11

The front scraper 11, Fig. 3, comprises a bracket 13 which includes a base part 14 and an outstanding plate or arm 15 which is integral with the base 14 and projects outwardly therefrom at right angles. The base 14 is provided on its rear side with an elongated vertical groove or guideway 16 which interfits with an elongated vertically extending lug 17 welded to the front of the dividing plate 5. The base 14, at the slotted guideway 16, is provided with an elongated slot 18 with an opened end and a rounded closed end. A setscrew 19 having a screw-threaded end 20 and a large knurled head 21 locks the base 14 to the lug 17 by tightening the threaded screw end 20 of the setscrew 19 with the threaded opening or hole 22 formed in the lug 17. The interfitting engagement of the guide slot with the lug 17 permits longitudinal or vertical movement of the bracket 13 for vertical adjustment with respect to the saw 10, Fig. 2, but prevents lateral or sideways movement of the bracket 13. The setscrew 19 includes an integral collar 23, Fig. 3, which is adapted to be pressed against the outside surface of the base 14 when the bracket 13 is applied in position and the setscrew 19 is tightened in place.

The forward outstanding plate or arm 15 is provided at its upper end with an elongated slot 24 and adjustably supports a backing wheel structure 25. The structure 25 includes a backing wheel 26 having a concentric opening 27 into which a ferrule or bushing 28 is received. A screw 29 has its threaded end 30 passing through the opening in the bushing 28 and through the horizontal slot 24 in the arm or plate 15. A nut 31 threadingly engages the threaded end 30 of the screw to tighten the backing wheel structure 25 in position. The ferrule or bushing 28 is slightly longer than the width of the wheel 26 so that when the nut 31 is tightened on the stem 30 of the setscrew 29, the head 32 of the setscrew 29 will bear against the outer edge of the bushing 28 and thus permit free revoluble movemnet of the wheel about its axis. Washers 33 may be arranged on opposite sides of the plate or arm 15. The head 32 of the screw 29 may be provided with a transverse slot 34 so that the screw 29 may be tightened or loosened by a screwdriver instead of using a wrench for tightening and loosening the nut 31.

A pair of opposed scraper blades 35 and 36 are separated at their lower ends by means of a ferrule 37. The lower ends of the members 35 and 36 are provided with holes 38 which are in alinement with each other and with the concentric opening 39 in the ferrule 37. An opening 40 provided at the lower end of the plate or arm 15 also alines with the holes 38, 38 and 39 and receives the threaded end 41 of a screw 42. A nut 43 threadingly engages the outer threaded end of the screw 42 and locks the scraper blades in position tightly against the opposite faces of the ferrule 37. The lower ends of the members 35 and 36 are tightly locked by means of the head 44 pressing against the outside surface of the blade 35 and the nut 43 holding the blade 36 in position against the face of the ferrule and the inside of the plate or arm 15.

The members 35 and 36 are preferably made of spring steel and the lower ends are relatively parallel, as shown in Figs. 2 and 3, more particularly Fig. 3. The upper ends of these members incline upwardly, as indicated at 45, Fig. 3, inclining toward each other. The inner surface of each of the members has fastened thereto blocks or strips of fibrous material 46. The inner upper edges of the fiber blocks or strips 46 engage the opposed side edges of the saw blade 10, as shown in Fig. 2.

*Rear scraper 12*

The rear scraper 12, to the right Fig. 3, comprises a bracket 47 which includes a base 48 and an outstanding plate or arm 49 which is integral with the base 48 and projects outwardly therefrom at right angles, Fig. 3. The base 48 is provided on its rear side with an elongated vertical groove or guideway 50 which interfits with an elongated vertically extending lug 51 welded to the front of the dividing plate 5. The base 48, at the grooved guideway 50, is provided with an elongated slot with a horseshoe shaped outline 52. A setscrew 53 having a screw-threaded end 54 and a large knurled head 55 locks the base 48 to the lug 51 by tightening the threaded screw end 54 of the setscrew 53 with a threaded opening or hole 56 formed in the lug 51. The interfitting engagement of the groove 50 with the lug 51 permits longitudinal or vertical movemnet of the bracket 47 for vertical adjustment with respect to the saw 10, Fig. 3, but prevents lateral or sideways movement of the bracket 47. The setscrew 53 includes an integral collar 57, Fig. 3, which presses against the outside surface of the base 48 when the bracket 47 is applied in position and the setscrew 53 is tightened in place.

A pair of opposed scraper blades 58 and 59 are separated at their upper ends by means of a ferrule 60. The upper ends of the members 58 and 59 are each provided with a hole 61 which is in alinement with the other and with the concentric opening 62 in the ferrule 60. An opening 63, provided midway between the upper and lower ends of the plate or arm 49, also alines with the holes in the members 58, 59 and 61, 61 and with the opening 62 in the ferrule 60 to receive the threaded end 64 of a screw 65. A nut 66 threadingly engages the outer threaded end of the screw 65 and locks the scraper baldes 58 and 59 in position tightly against the opposite faces of the ferrule 60. The lower ends of the members 58 and 59 are tightly held in place by means of a screw head 67 pressing against the outside surface of the blade 59 and the nut 66, holding the blade 58 in position against the face of the ferrule 60 and the inside of the plate or arm 49.

The members 58 and 59 are preferably made of spring steel, and their upper ends are relatively parallel as shown in Figs. 2 and 3, particularly Fig. 3. The lower ends of these members 58 and 59 extend downwardly, as indicated at 68, Fig. 3, inclining toward each other. The inner surface of each of the members has fastened thereto blocks or strips 69 of fibrous material. The inner upper edges of the fiber blocks or strips 69 engage the opposed side edges of the saw blade 10 as shown in Fig. 2.

The scrapers of the invention each comprise a unitary element having few and simple parts which may be readily and economically manufactured. Each scraper or wiper is adapted to be quickly applied and readily removed for cleaning purposes. Each may be adjusted vertically adjacent the periphery of a saw pulley to bring it in proper position, but they are prevented from lateral side shifting or pivotal movement so that the parts will always be in alinement with the opposed faces of the running saw.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A meat and bone saw comprising a machine frame, a pair of spaced pulleys carried by said frame, an endless saw trained over said pulleys, and a pair of saw blade scraper assemblies each demountably secured to said frame adjacent a pulley and on opposite sides of said latter pulley to scrape bone dust and meat particles from the saw, each of said assemblies comprising a bracket having a base with a vertical guide groove formed in the rear face of the base and a slot having a U-shaped outline through the base in front of the guide groove, a lug fixed to a part of the frame receivable in said groove, a locking setscrew extending through said slot and threadedly engaging said lug for locking said base to the lug, a bracket plate integral with said base and extending outwardly therefrom, and a pair of spring steel blade scraper arms secured to each plate at one side of each plate and having their outer ends inclining toward each other, and the ends of the steel scraper arms on one side of said last named pulley projecting upwardly and on the other side projecting downwardly.

2. A meat and bone saw comprising a machine frame, a pair of spaced pulleys carried by said frame, an endless saw trained over said pulleys, and a saw blade scraper assembly demountably secured to said frame adjacent a pulley to scrape bone dust and meat particles from the saw, said assembly comprising a bracket having a base with a vertical guide groove formed in the rear face of the base and a slot with a U-shaped outline through the base in front of the guide groove, a lug fixed to a part of the frame receivable in said groove, a locking setscrew extending through said slot and threadedly engaging said lug for locking said base to the lug, a bracket plate integral with said base and extending outwardly therefrom, a lock screw extending outwardly at one side of said plate, a ferrule about said screw, a spring steel scraper arm mounted on said latter screw at each end of the ferrule, said blade scrape arms having their ends at the ferrule parallel to each other and their free ends inclining toward each other, and fiber blocks secured to the inner surfaces of the arms.

3. A meat and bone saw comprising a machine frame, a pair of spaced pulleys carried by said frame, an endless saw trained over said pulleys, and a saw blade scraper member demountably secured to said frame adjacent a pulley to scrape bone dust and meat particles from the saw, said scraper member comprising a bracket including a base having a guide groove formed in its rear face and a slot with a U-shaped outline through the base in front of a part of the guide groove, a lug on a part of the frame receivable in said groove, a locking setscrew extending through said slot and threadedly engaging said lug for locking said base to the lug, a bracket plate integral with said base and extending outwardly therefrom, a pair of spring steel blade scraper arms arranged at one side of the plate and having outer attaching ends parallel to each other, a ferrule between said arms, a locking screw passing through said arms, said ferrule and said plate, means to lock said arms against the ends of the ferrule, and fiber scraper blocks secured to the upper ends of the steel scraper arms and inclining toward each other.

4. A meat and bone saw comprising a machine frame, a pair of spaced pulleys carried by said frame, an endless saw trained over said pulleys, and a saw blade scraper member demountably secured to said frame adjacent a pulley to scrape bone dust and meat particles from the saw, said scraper member comprising a bracket including a base having a guide groove formed in its rear face and a slot with a U-shaped outline through the base in front of a part of the guide groove, a lug on a part of the frame receivable in said groove, a locking setscrew extending through said slot and threadedly engaging said lug for locking said base to the lug, a bracket plate integral with said base and extending outwardly therefrom, a pair of spring steel blade scraper arms secured to said plate at one side of the plate and having their outer ends inclining toward each other, fiber scraper blocks secured to the upper ends of the steel scraper arms, a saw backing roller on said plate on the same side of the plate as the arms, and mounting means to mount the roller on the plate, said mounting means including a horizontal slot in the plate, and a screw passing through the roller and securing the roller to the plate.

5. A meat and bone saw comprising a machine frame, a pair of spaced pulleys carried by said frame, an endless saw trained over said pulleys, and a saw blade scraper assembly demountably secured to said frame adjacent a pulley to scrape bone dust and meat particles from the saw, said assembly comprising a bracket having a base with a vertical guide groove formed in the rear face of the base and a slot with a U-shaped outline through the base in front of the guide groove, a lug fixed to a part of the frame receivable in said groove, a locking setscrew extending through said slot and threadedly engaging said lug for locking said base to the lug, a bracket plate integral with said base and extending outwardly therefrom, a lock screw extending outwardly at one side of said plate, a ferrule about said screw, a spring steel scraper arm mounted on said latter screw at each end of the ferrule, said blade scrape arms having their ends at the ferrule parallel to each other and their free ends inclining toward each other, fiber blocks secured to the inner surfaces of the arms, a saw backing roller on said plate on the same side of the plate as the arms, and mounting means to mount the roller on the plate, said mounting means including a horizontal slot in the plate, and a screw passing through the roller and securing the roller to the plate.

References Cited in the file of this patent
UNITED STATES PATENTS

| | | |
|---|---|---|
| 425,105 | McChesney | Apr. 8, 1890 |
| 928,133 | Keighley | July 13, 1909 |
| 1,004,204 | Rost | Sept. 26, 1911 |
| 1,419,552 | Freed | June 13, 1922 |
| 2,135,488 | Baker | Nov. 8, 1938 |
| 2,572,938 | Lasar | Oct. 30, 1951 |
| 2,741,281 | Braun | Apr. 10, 1956 |